US011166581B1

(12) United States Patent
Jackson

(10) Patent No.: US 11,166,581 B1
(45) Date of Patent: Nov. 9, 2021

(54) TIP RESISTANT ART DISPLAYS

(71) Applicant: Vital Marketing, Incorporated, Tupelo, MS (US)

(72) Inventor: Terry Jackson, Tupelo, MS (US)

(73) Assignee: VITAL MARKETING, INCORPORATED, Tupelo, MS (US)

( * ) Notice: Subject to any disclaimer, the term of this patent is extended or adjusted under 35 U.S.C. 154(b) by 0 days.

(21) Appl. No.: 16/938,082

(22) Filed: Jul. 24, 2020

(51) Int. Cl.
*A47G 33/00* (2006.01)
*F16M 11/22* (2006.01)
*F21V 33/00* (2006.01)
*C03B 25/02* (2006.01)
*C03C 19/00* (2006.01)
*C03B 19/00* (2006.01)
*F21Y 115/10* (2016.01)

(52) U.S. Cl.
CPC .............. *A47G 33/00* (2013.01); *C03B 19/00* (2013.01); *C03B 25/02* (2013.01); *C03C 19/00* (2013.01); *F16M 11/22* (2013.01); *F21V 33/0028* (2013.01); *F16M 2200/08* (2013.01); *F21Y 2115/10* (2016.08)

(58) Field of Classification Search
CPC .................................................. F21V 33/0028
See application file for complete search history.

(56) References Cited

U.S. PATENT DOCUMENTS

| 1,769,000 A * | 7/1930 | Smith .................. F21V 1/00 |
| | | 428/46 |
| 1,949,551 A | 3/1934 | Somervell |
| 2,714,652 A | 8/1955 | Meyer |
| 3,532,874 A | 10/1970 | Rosenast |
| 3,721,815 A | 3/1973 | Wall |
| 4,349,864 A | 9/1982 | Smith |
| 2,723,341 A | 11/1985 | Greenspan |
| 4,672,513 A | 6/1987 | Von Kohorn et al. |
| 4,758,934 A | 7/1988 | Von Kohorn |
| 6,511,196 B1 | 1/2003 | Hoy |
| 6,739,746 B1 * | 5/2004 | Tang ...................... A47G 33/06 |
| | | 362/122 |
| 7,473,002 B1 * | 1/2009 | Chen ....................... F21S 10/00 |
| | | 362/283 |

(Continued)

OTHER PUBLICATIONS

Ifolaina, Ifolaina Crystal LED Light Base Multicolor Changing Color Show Stand Lighted Display Plate AC Power for 3D Glass Art, site visited Apr. 30, 2020, https://www.amazon.com/IFOLAINA-Light-Multicolor-Crystal-Display/dp/B07SSYPJFR.

(Continued)

*Primary Examiner* — Bryon T Gyllstrom
*Assistant Examiner* — Christopher E Dunay
(74) *Attorney, Agent, or Firm* — Standley Law Group LLP

(57) ABSTRACT

Systems and methods for displaying art in a manner which resists tipping from external forces while preserving artistic impression are disclosed. An art piece includes an inner core extending from a bottom of a display portion and an outer stabilizing core formed about the inner core. A base includes a recess located within a housing. The recess is configured to snugly receive the stabilizing core. A number of illumination devices are located within the recess and electrically connected to a power supply for illuminating the art piece. In some embodiments, holes may be formed in the base for fastening the base to a surface.

11 Claims, 17 Drawing Sheets

(56) References Cited

U.S. PATENT DOCUMENTS

| | | | | |
|---|---|---|---|---|
| 7,594,350 B2* | 9/2009 | Yang | ................ | A47G 1/0622 |
| | | | | 40/406 |
| 2011/0205729 A1* | 8/2011 | Yang | ................ | A47G 33/06 |
| | | | | 362/101 |
| 2014/0268705 A1* | 9/2014 | Yang | ................ | F21S 9/02 |
| | | | | 362/186 |
| 2019/0145594 A1* | 5/2019 | Blanchette | ........ | F21V 23/0435 |
| | | | | 362/127 |
| 2019/0219260 A1* | 7/2019 | Wang | ................ | F21S 10/023 |
| 2020/0170423 A1* | 6/2020 | Bun | ................ | F21V 33/0028 |

OTHER PUBLICATIONS

Erwei, Erwei LED Light Base Spherical Recess Show Crystal Ball Stand for 3D Laser Crystal Glass Art with Sensitive Touch Switch, site visited Apr. 30, 2020, https://www.amazon.com/Erwei-Spherical-Recess-Crystal-Sensitive/dp/B07BDFFN7W.

Art Boards Archival Art Supply, Sculpture Pedestal with lighting, site visited Apr. 30, 2020, https://www.art-boards.com/Sculpture%20Base%207.htm.

* cited by examiner

TIP RESISTANT ART DISPLAYS

CROSS-REFERENCE TO RELATED APPLICATIONS

This application makes no priority claim.

TECHNICAL FIELD

Exemplary embodiments relate generally to tip resistant art pieces and bases for the same.

BACKGROUND AND SUMMARY OF THE INVENTION

Art or other decorative objects are often subject to external forces. Some of these art pieces may be worth a significant amount of money or may have significant emotional or spiritual value to an individual. Examples of such external forces include, but are not limited to, bumps, jarring, and vibrations caused by persons, animals, nearby equipment, earthquakes, or the like. It is known to use wax products to assist in securing art pieces. However, the wax may be insufficient to secure the object against more violent forces. Glues and other more permanent adhesives are not typically used as they may damage the art.

Furthermore, some of these art pieces incorporate, require, or benefit from, illumination. Often, the art pieces are placed on an illuminated base. The heat from the illumination devices may cause any wax or adhesive used to secure the device to melt or otherwise be rendered ineffective. Further challenges are provided by a desire to preserve the artistic impression created by the work. Therefore, what is needed is a system and method for securing art pieces against tipping which preserve the artistic impression of the underlying work.

Systems and methods for securing art pieces against tipping are provided which preserve, or even enhance, the artistic impression of the underlying work. An art pieces may comprise a display portion and a stabilizing core extending from a bottom of the display portion. In exemplary embodiments, the stabilizing core may form a cylindrical shape. The diameter of the display portion immediately adjacent to the stabilizing core may increase relative to the diameter of the cylindrical core. A recess may be formed in a base for receiving the stabilizing core. In exemplary embodiments, a gap of no more than 1.8 mm, by way of a non-limiting example, remains between the stabilizing core and the recess when the stabilizing core is secured within the base. The height of the recess may be equal to or less than the height of the stabilizing core such that that display portion extends above the base.

Illumination devices may be placed within the recess which are electrically connected to a power source. A lip may be formed in the recess to secure a bottom surface of the stabilizing core above the illumination devices. Wax, silicon, or another substance may be placed on the stabilizing core to assist in securing the art piece. The art piece may comprise of glass or another visually transmissive material such that it may be illuminated by the illumination devices. The recess may be formed after the stabilizing core to ensure a proper, snug fit which provides stability against tipping.

In exemplary embodiments, an outer stabilizing core may be formed about an inner core. The inner core may be comprised of the same material as the display portion, such as glass, and may be integrally formed therewith. The outer stabilizing core may be formed of a resin. The art piece may be placed in a rig and resin for the outer stabilizing core may be poured around the inner core and cured. This may provide a wider base for additional stability. This may, alternatively or additionally, maintain a strong inner core. This may, alternatively or additionally, create a shock resistant outer stabilizing core. The recess of the base may be sized to accommodate the outer stability core. In exemplary embodiments, a gap of not more than 1.8 mm is provided between the recess of the base and the outer surface of the outer stability core to ensure a snug fit.

Stability may be particularly important as the disclosed art pieces may weigh several pounds, such as but not limited to, up to 22 lbs. by way of non-limiting example.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 1 is a perspective view of an exemplary base and art piece in accordance with the present invention;

FIG. 2 is a front view of the exemplary art piece of FIG. 2;

FIG. 3 is a front view of another exemplary art piece for use with the base of FIG. 1;

FIG. 4 is a front view of another exemplary art piece in accordance with the present invention;

FIG. 5 is a detailed front view of detail A of FIG. 4;

FIG. 6 is a detailed front view of another exemplary art piece in accordance with the present invention;

FIG. 7 is a front view of the art piece of FIG. 6 with an outer stabilizing core formed about an inner core;

FIG. 8 is a detailed front view of detail A of FIG. 7;

FIG. 9 is a front view of another exemplary art piece in accordance with the present invention having the outer stabilizing core;

FIG. 10 is a front view of another exemplary art piece in accordance with the present invention having the outer stabilizing core;

FIG. 11 is a detailed front view of detail C of FIG. 10;

FIG. 12 is a front view of an exemplary rig for molding the outer stabilizing core of FIGS. 7-11;

FIG. 13 is a top view of another exemplary base in accordance with the present invention for use with the art pieces of FIGS. 7-11;

FIG. 14 is a top view of two other exemplary bases in accordance with the present invention for use with the art pieces of FIGS. 7-11;

FIG. 15 is a detailed side view of one of the bases of FIG. 14 with an exemplary art piece with an exemplary outer stabilizing core secured within the base;

FIG. 16 is a perspective view of the base with installed art piece of FIG. 15; and FIG. 17 is a bottom view of another exemplary base in accordance with the present invention.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
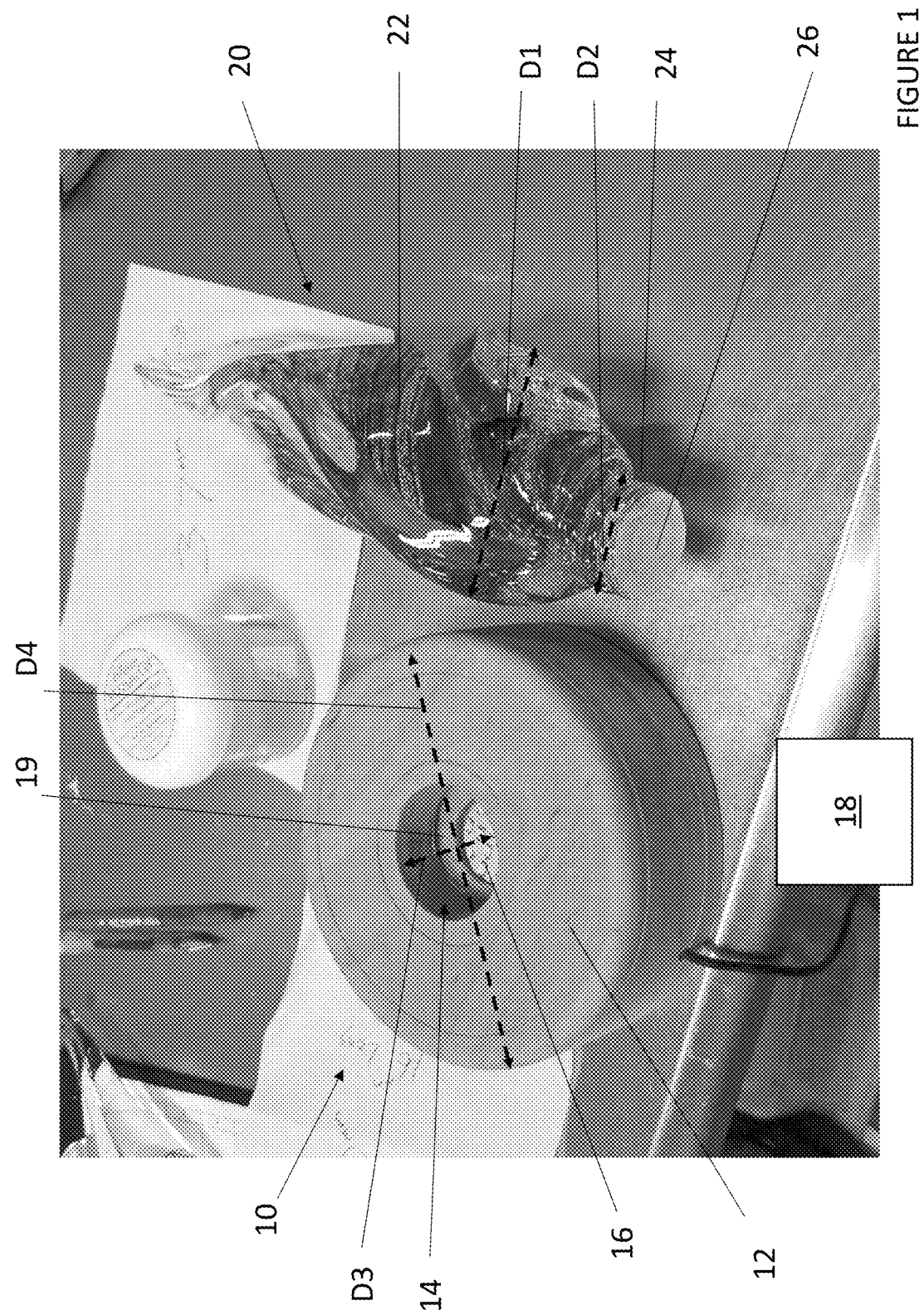

FIG. 1 is a perspective view of an exemplary base 10 and art piece 20 in accordance with the present invention. The base 10 may comprise a housing 12. The housing 12 may comprise a wood, polymer, metal, some combination thereof, or the like. The housing 12 may comprise any material, or combination of materials.

A recess 14 may be provided in the housing 12. In exemplary embodiments, the recess 14 may be cylindrical in shape. However, any size and shape recess 14 may be utilized. The recess 14 may be machined out of, or otherwise formed into, the housing 12. In other exemplary embodiments, the recess 14 is integrally formed with the housing 12.

In exemplary embodiments, the housing 12 may form a cylindrical shape. A diameter D4 of the housing 12 may be at least twice a diameter D3 of the recess 14. In this way, the housing 12 may provide stability against external forces. However, any size and shape housing 12 may be utilized.

One or more illumination devices 16 may be provided within the recess 14. In exemplary embodiments, the illumination devices 16 are provided along a bottom surface of the recess and oriented to provide upwardly directed illumination. However, any number, orientation, size, shape, and position of illumination devices 16 may be utilized. The illumination device 16 may comprise light emitting diodes (LED), though any type of illumination device, or combination thereof, are contemplated.

The illumination devices 16 may be in electrical connection with one or more power supplies 18. The power supplies 18 may comprise a plug, outlet, utility power, a battery receptacle, one or more batteries, some combination thereof, or the like.

The art piece 20 may comprise a display portion 22. The display portion 22 may comprise one or more artistic elements such as, but not limited to, colors, patterns, swirls, dye, droplets, images, some combination thereof, or the like. The display portion 22 may take any shape, such as but not limited to, a flame, cylinder, sphere, some combination thereof, or the like. Any size and shape of display portion 22 may be utilized.

The art piece 20 may comprise a stabilizing core 24. The stabilizing core 24 may comprise a cylindrical portion extending from the display portion 22. The display portion 22 may, at least initially, increase in diameter from the stabilizing core 24 into the display portion 22. The display portion may comprise a maximum width dimension D1, such as a diameter. The dimension D1 may be larger than a maximum diameter D2 of the stabilizing core 24.

A substance 26 may be deposited on a lower surface of the stabilizing core 24. The substance 26 may be configured to assist in securing the art piece 20 to the base 10. For example, without limitation, the substance 26 may comprise wax, silicon, putty, paste, some combination thereof, or the like. The substance 26 may comprise a transparent or translucent material.

The stabilizing core 24 may extend from the display portion 22 a length at least as long as a height of the recess 14. In this way, the display portion 22 may remain entirely visible and elevated above the recess 14. The stabilizing core 24 may be configured to fit snugly within the recess 14 to prevent tipping under a range of external forces. In exemplary embodiments, the recess 14 and/or the stabilizing core 24 may be formed to leave a gap of 1.8 mm, by way of a non-limiting example.

In exemplary embodiments, a lip 19 may be provided about the recess 14. The lip 19 may be provided near the bottom of the recess 14 to elevate the art piece 20 above the illumination device 16 such that the art piece 20, and particularly the stabilizing core 24, does not directly touch the illumination devices 16. This may protect the illumination devices 16. In exemplary embodiments, the bottom of the stabilizing core 24 may comprise a flat surface. The bottom of the recess 14 and/or the lip 19 may likewise comprise a flat surface configured to provide stability between the stabilizing core 24 and the recess 14 and/or the lip 19.

In exemplary embodiments, the substance 26 may be provided only on the portion of the stabilizing core 24 above the illumination elements 16 to provide support between the illumination elements 16 and the stabilizing core 24 and/or protect the illumination elements 16. The substance 26 may, additionally or alternatively, assist in distributing the light from the illumination elements 16. In such embodiments, other portions of the stabilizing core 24 may rest directly against the lip 19. In other exemplary embodiments, the substances 26 may be provided only on the portion of the stabilizing core 24 not directly above the illumination elements 16.

Figure 2:
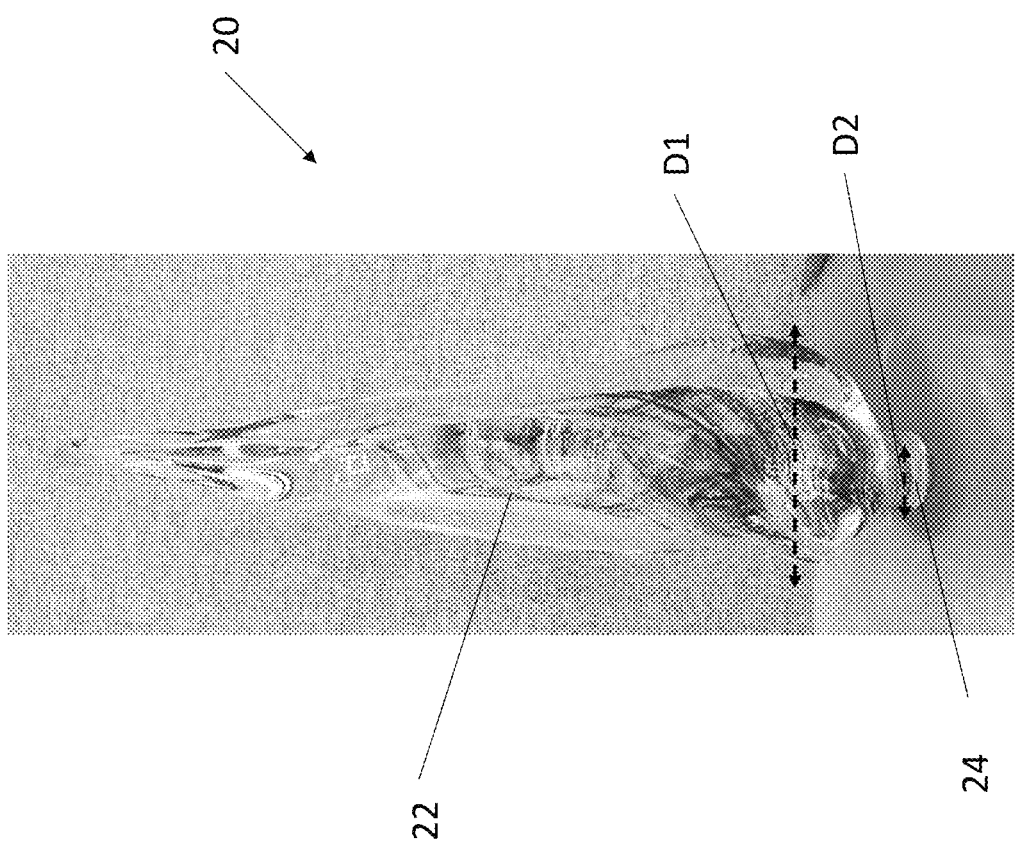
Figure 3:
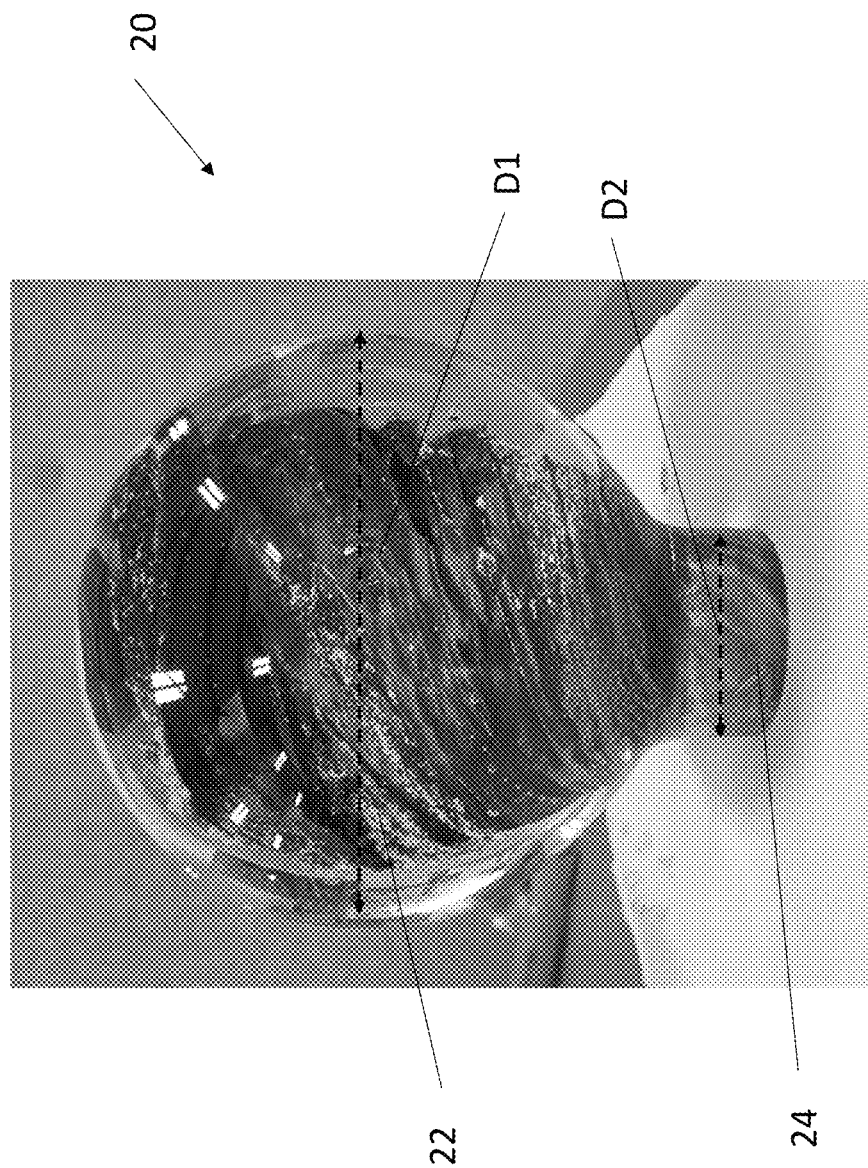

FIG. 2 is a front view of the exemplary art piece 20 of FIG. 2. FIG. 3 is a front view of another exemplary art piece 20 in accordance with the present invention. Any kind or type of art piece 20 may be utilized with a corresponding base 10. The art piece 20 may comprise a transparent, translucent, or other visually conductive material such that light from the illumination devices 16 may travel through the stabilizing core 24 to illuminate the display portion 22 of the art piece 20. In exemplary embodiments, the art piece 20 may comprise glass. The stabilizing core 24 may be integrally formed with the display portion 22 by extension from a bottom of the display portion 22.

The stabilizing core 24 may be formed by heating the material to 1800° F. A double jack line may be cut into material and smoothed. The stabilizing core 24 may be chilled to 922° F. The stabilizing core 24 may be annealed for 26 hours. The stabilizing core 24 may be polished.

Any number, type, size, or the like of art pieces 20 may be utilized. The base 10 may be modified to accommodate larger, smaller, or different shaped art pieces 20. In exemplary embodiments, without limitation, the art piece 20, and particularly but not limited to the stabilizing core 24, is formed first. The base 10, and particularly but not limited to the recess 14, may be formed second. The recess 14 may be formed such that a gap of 1.8 mm, by way of a non-limiting example, is left between the outer side surface of the stabilizing core 24 and the corresponding surface of the recess 14 when the art pieces 20 is secured within the base 10. The recess 14 may be formed to create the lip 19 about the recess 14.

Figure 4:
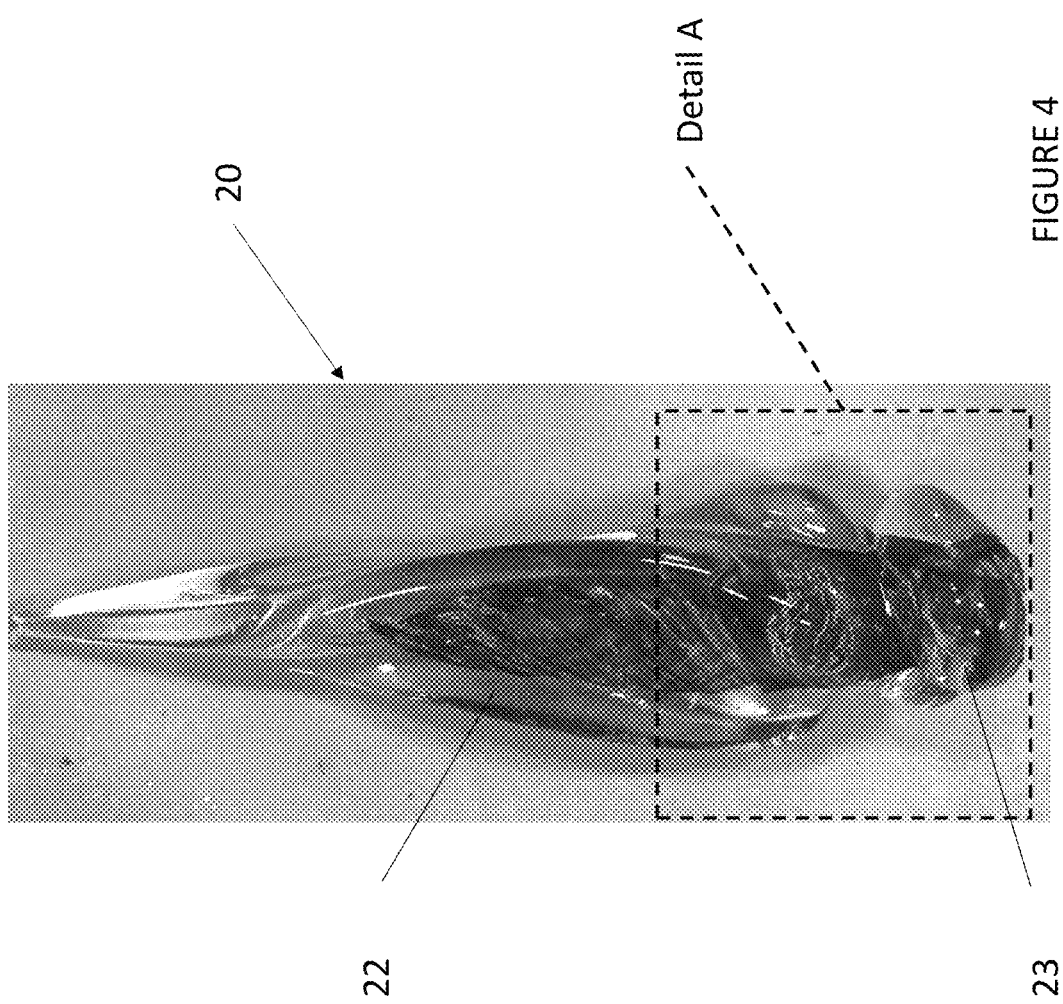
Figure 5:
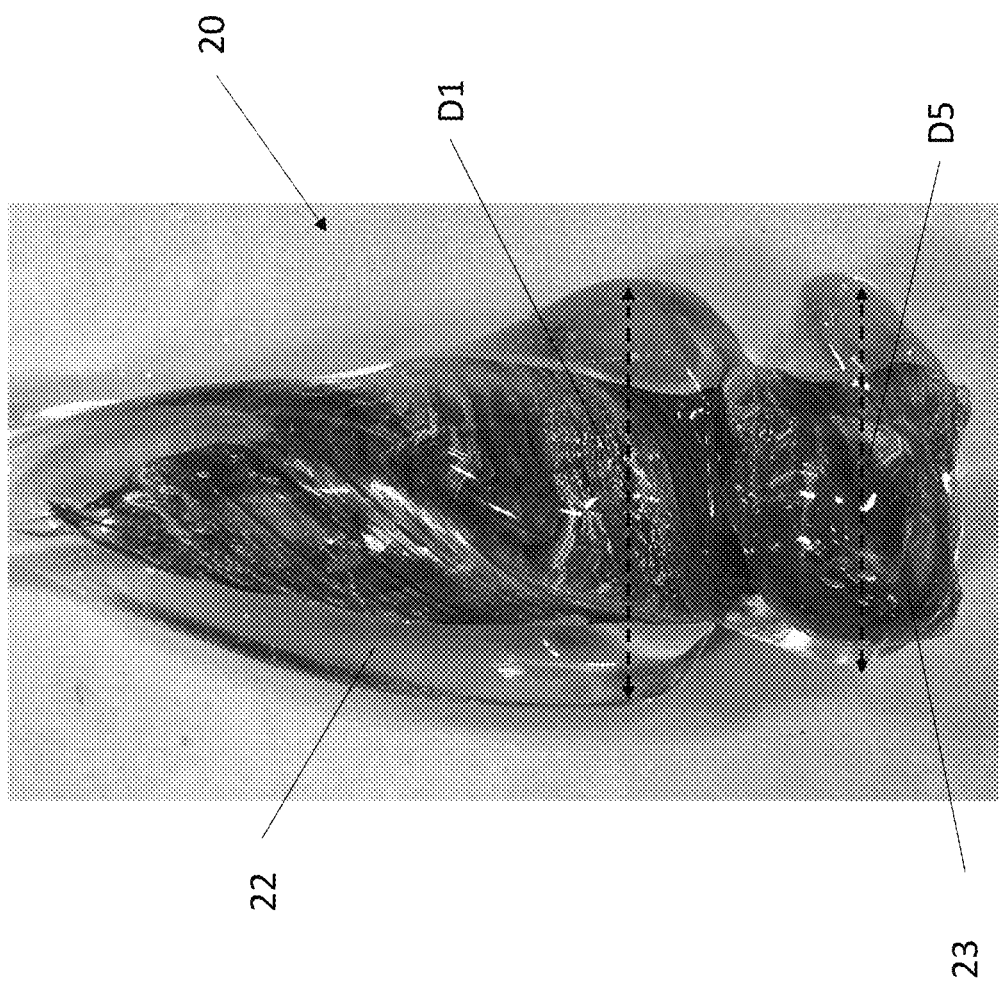
Figure 6:
Figure 7:
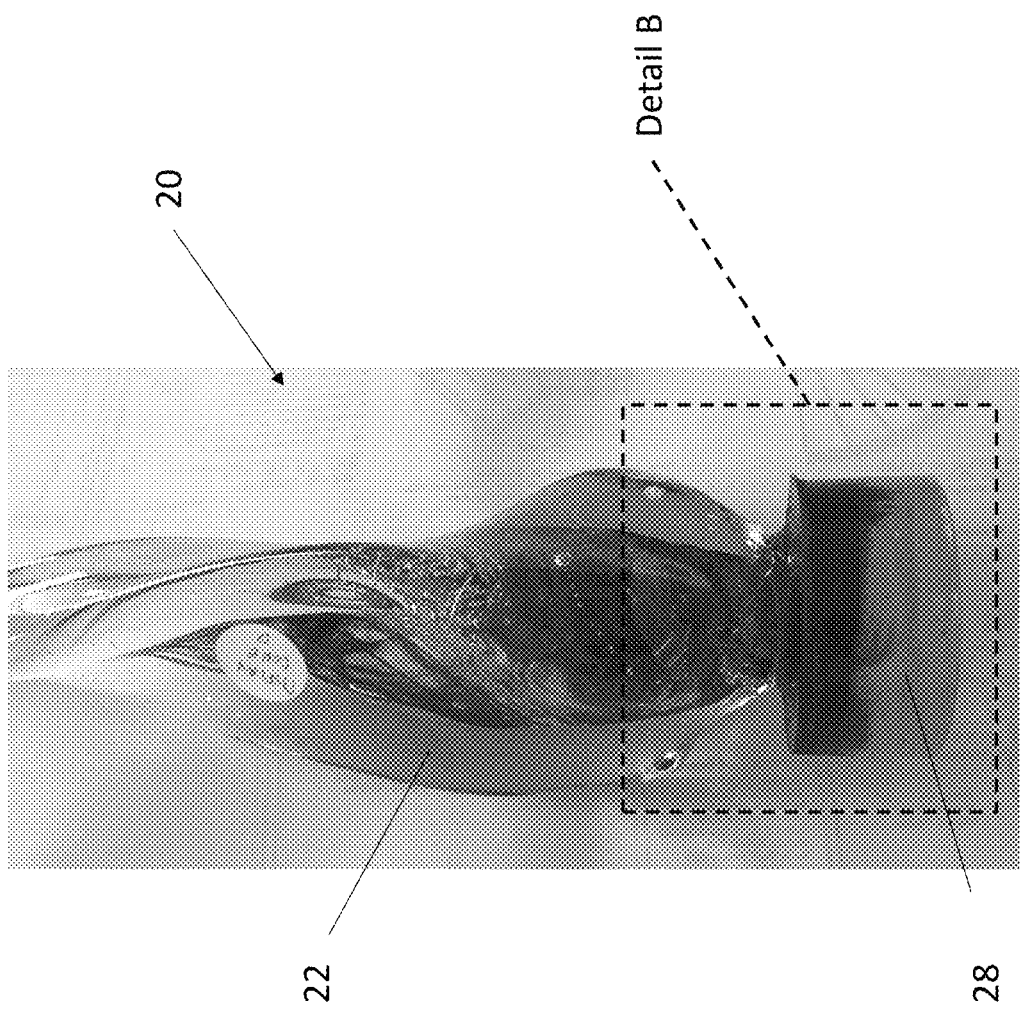
Figure 8:
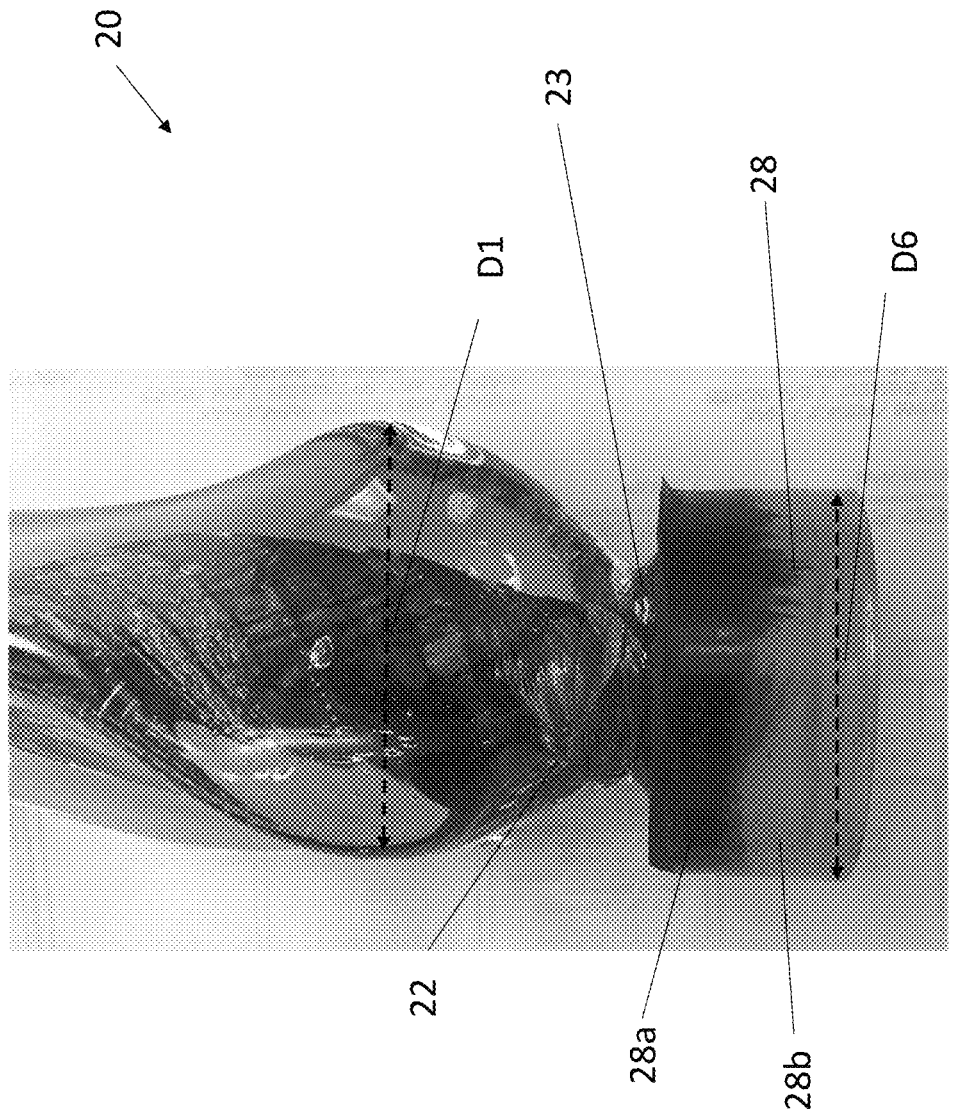
Figure 9:
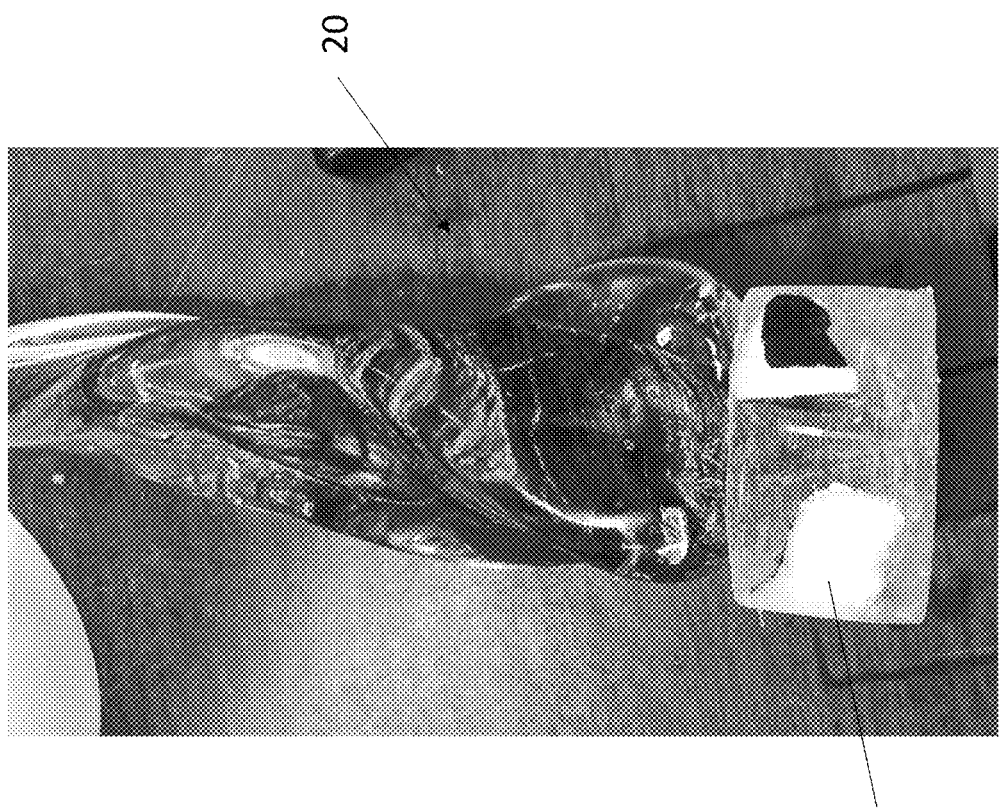
Figure 10:
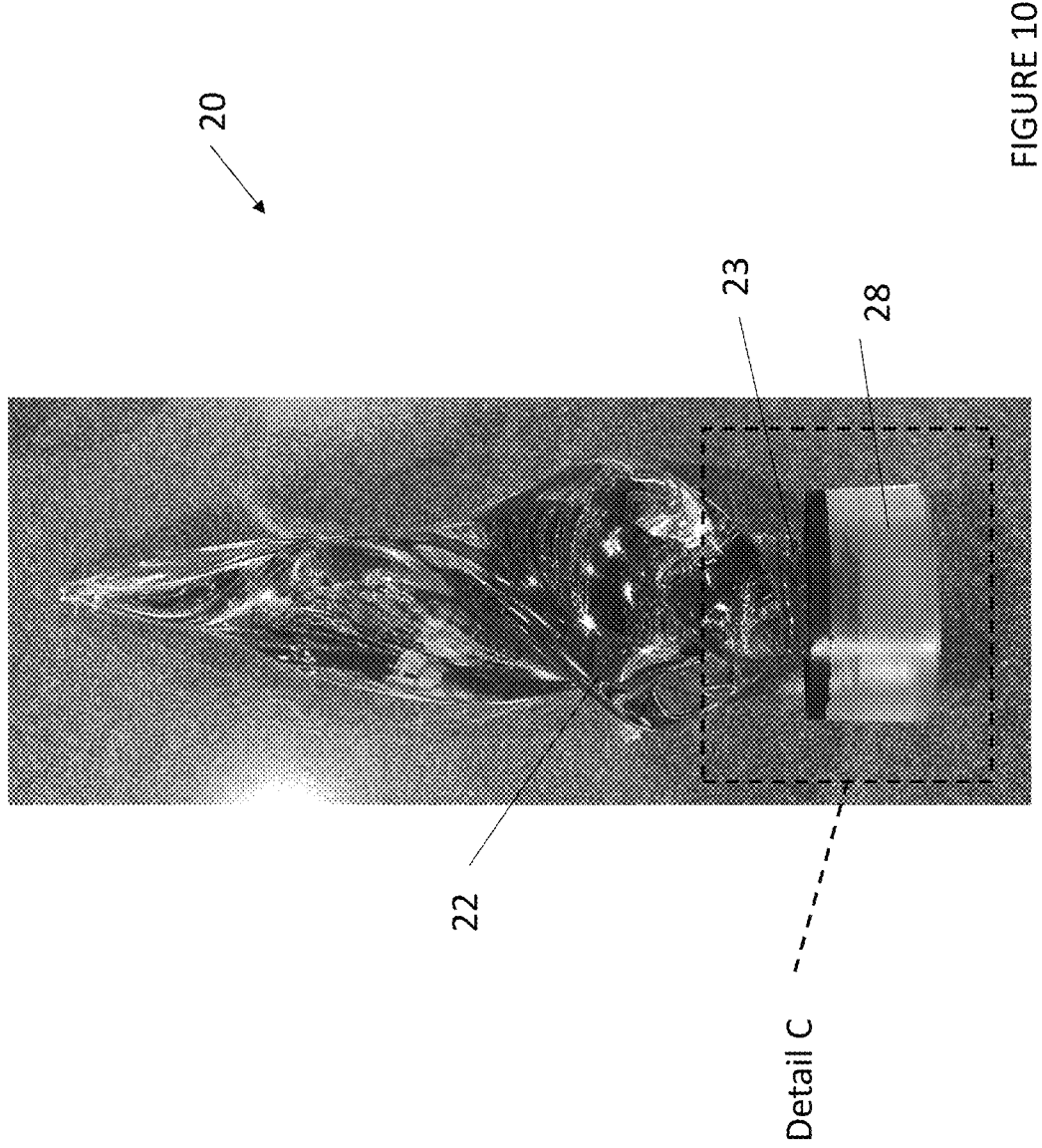
Figure 11:
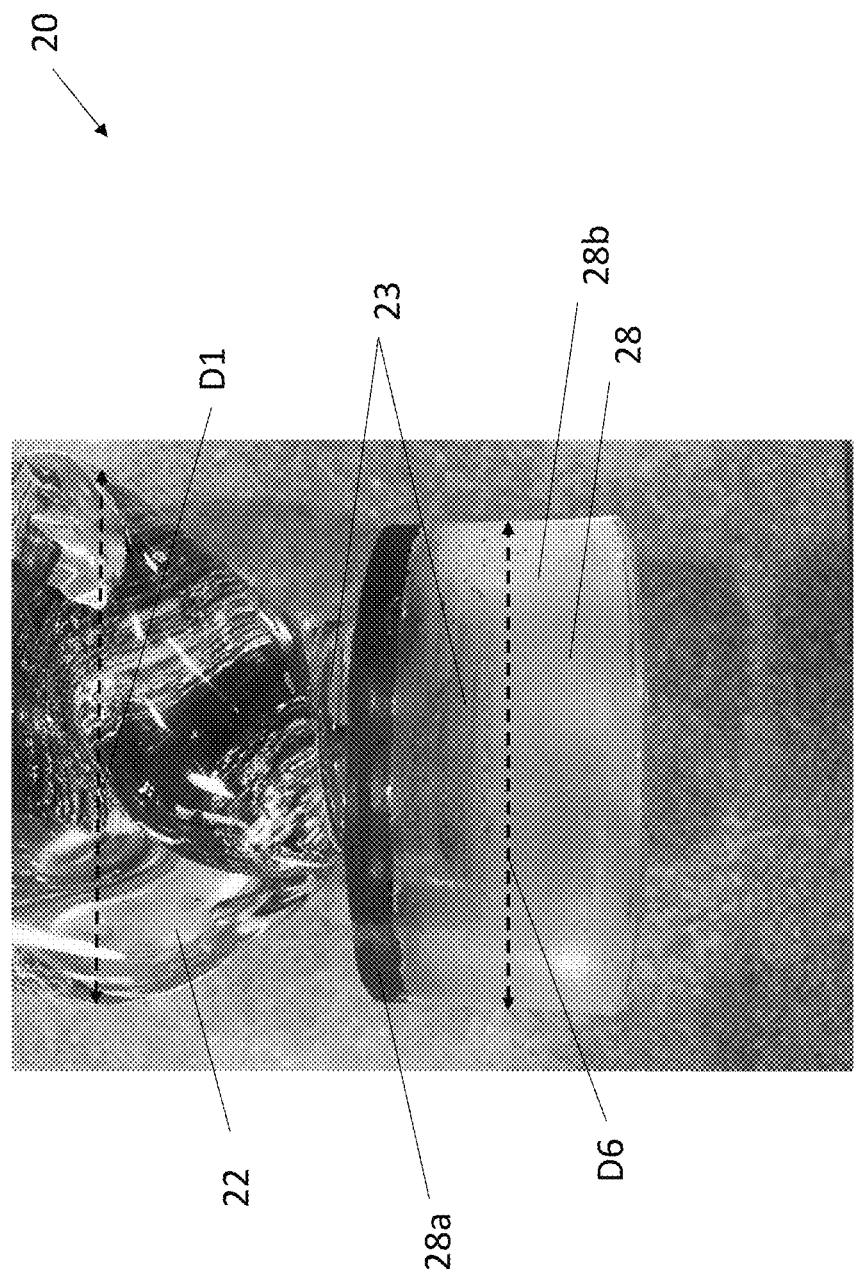

FIG. 4 through FIG. 6 illustrates other exemplary art pieces 20. The display portion 22 may be attached to an inner core 23. The inner core 23, in exemplary embodiments, may be formed of at least some of the same material as the display portion 22. For example, without limitation, the display portion 22 and the inner core 23 may comprise glass. In exemplary embodiments, the inner core 23 is comprised of a visually transmissive material to permit light, such as produced by the illumination elements 16 of the base 10, to travel through the inner core 23, such as into the display portion 22. The inner core 23, may be integrally formed with the display portion 22.

The inner core 23 may be formed, at least in part, by extending a portion of the display portion 22 downward. A double jack line may be cut into molten glass and may be smoothed. Such cutting and/or smoothing may be performed at relatively high temperatures, such as but not limited, at or around 1800° F. Other temperatures between 1000° F. and 2500° F. may be utilized, for example without limitation. Once the inner core 23 is formed, it may be cooled down to a lower temperature, such as but not limited to 922° F. Other temperatures, such as but not limited 500° F. to 1500° F. may be utilized, for example without limitation. The inner core 23 may be annealed for a period of time, such as but not limited to 26 hours. Other anneal times, such as but not limited to, 10-30 hours may be utilized. The inner core 23 may be polished.

The inner core 23 may define a maximum width dimension D5, such as a diameter. The dimension D5 may be larger than the diameter D4 of the stabilizing core 24, though such is not required. The dimension D5 may be the same or smaller than the dimension D1 of the display portion 22, though such is not required. The dimension D1 of the display portion 22 immediately adjacent to the inner core 23 may increase relative to the diameter D6 of the outer stabilizing core 28.

FIG. 7 through FIG. 11 illustrate exemplary art pieces 20 with an outer stabilizing core 28. The outer stabilizing core 28 may be formed about the inner core 23. In exemplary embodiments, the outer stabilizing core 28 may comprise a resin. The outer stabilizing core 28 may be comprised of a transparent, or translucent material. In exemplary embodiments, an upper portion 28a of the outer stabilizing core 28 may be dyed with a color, such as but not limited to a shade of blue or black, or otherwise formed with a translucent and/or opaque material. A lower portion 28b of the outer stabilizing core 28 may be naturally colored and/or formed with a translucent or transparent material. By way of a non-limiting example, the upper portion 28a may form 90% of the outer stabilizing core 28 and the lower portion 28b may form 10% of the outer stabilizing core. The dye or other material may be configured to prevent light, such as from the illumination elements 16 of the base 10, from passing through an upper portion 28a of the outer stabilizing core 28. In this way, light may instead pass through the inner core 23 and into the display portion 22.

The substance 26 may be deposited on a lower surface of the outer stabilizing core 28 to help secure it to the base 10. The substance 26 may be transparent or translucent to permit light, such as from the illumination elements 16 of the base 10, to pass therethrough.

A diameter D6 of the outer stabilizing core 28 may be larger than the dimension D5 of the inner core 23. The diameter D6 may be the same or larger than the dimension D1 of the display portion 22. The dimension D1 of the display portion 22 immediately adjacent to the outer stabilizing core 28 may increase relative to the diameter D6 of the outer stabilizing core 28.

The inner core 23 may be the same or different from the stabilizing core 24.

Figure 12:
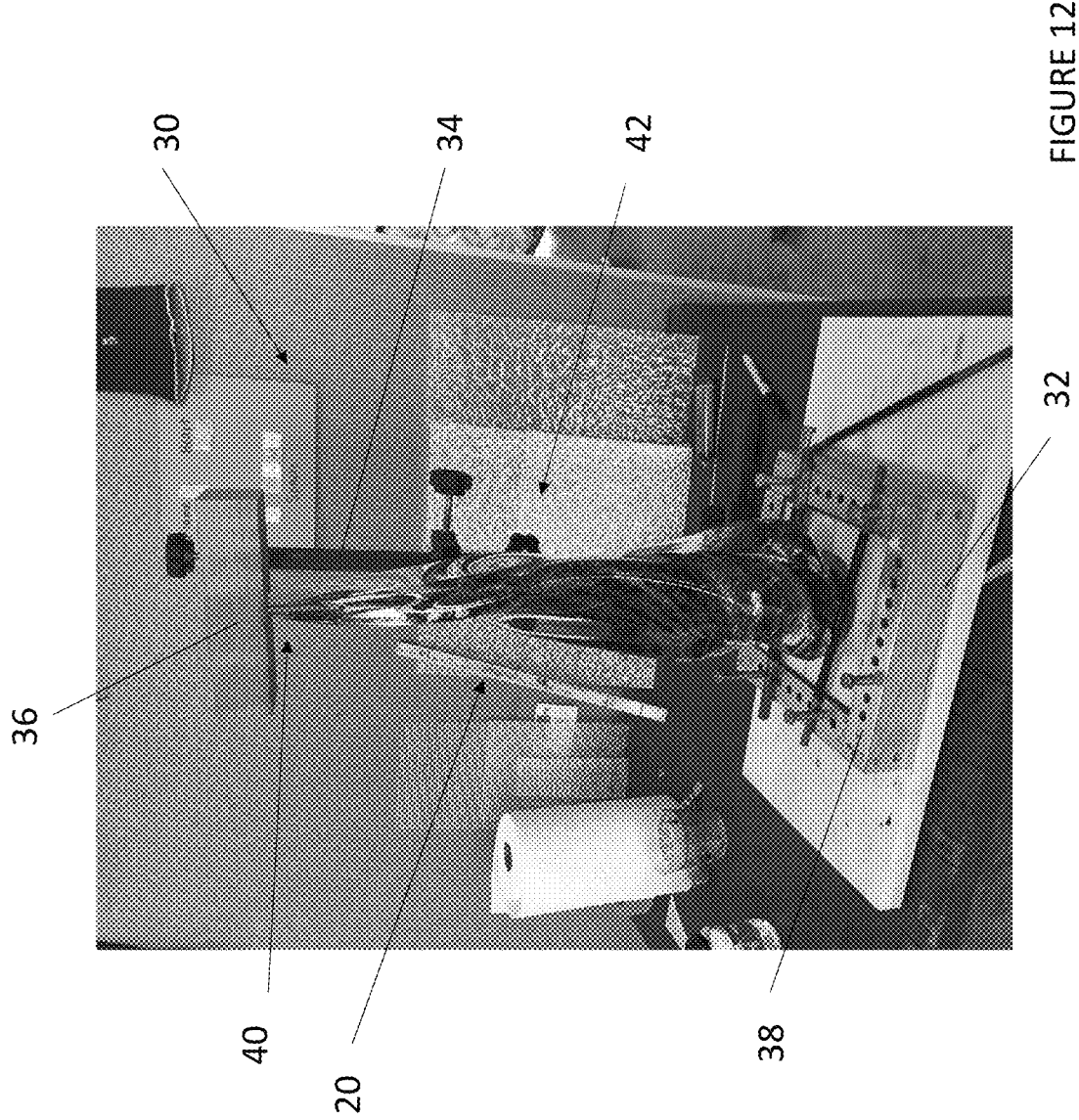
Figure 13:
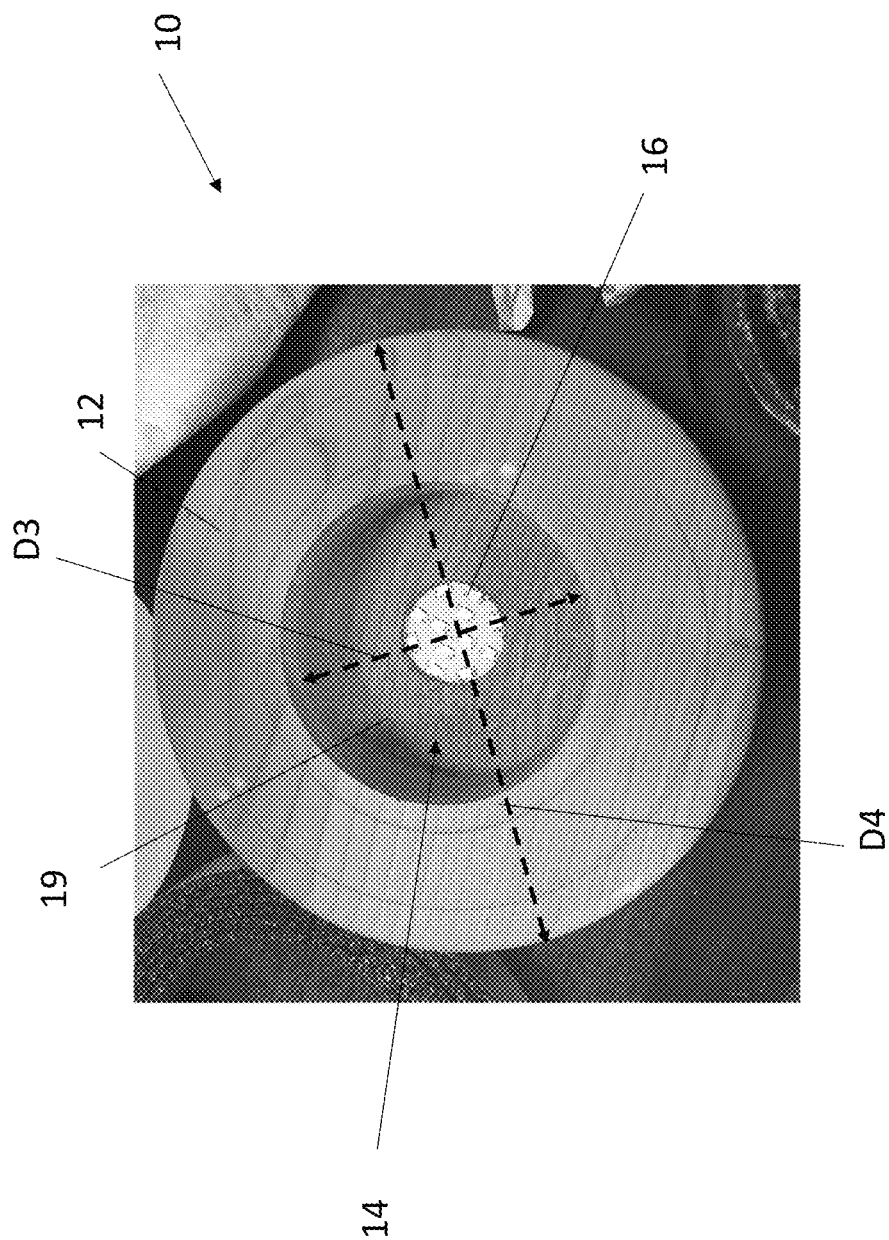
Figure 14:
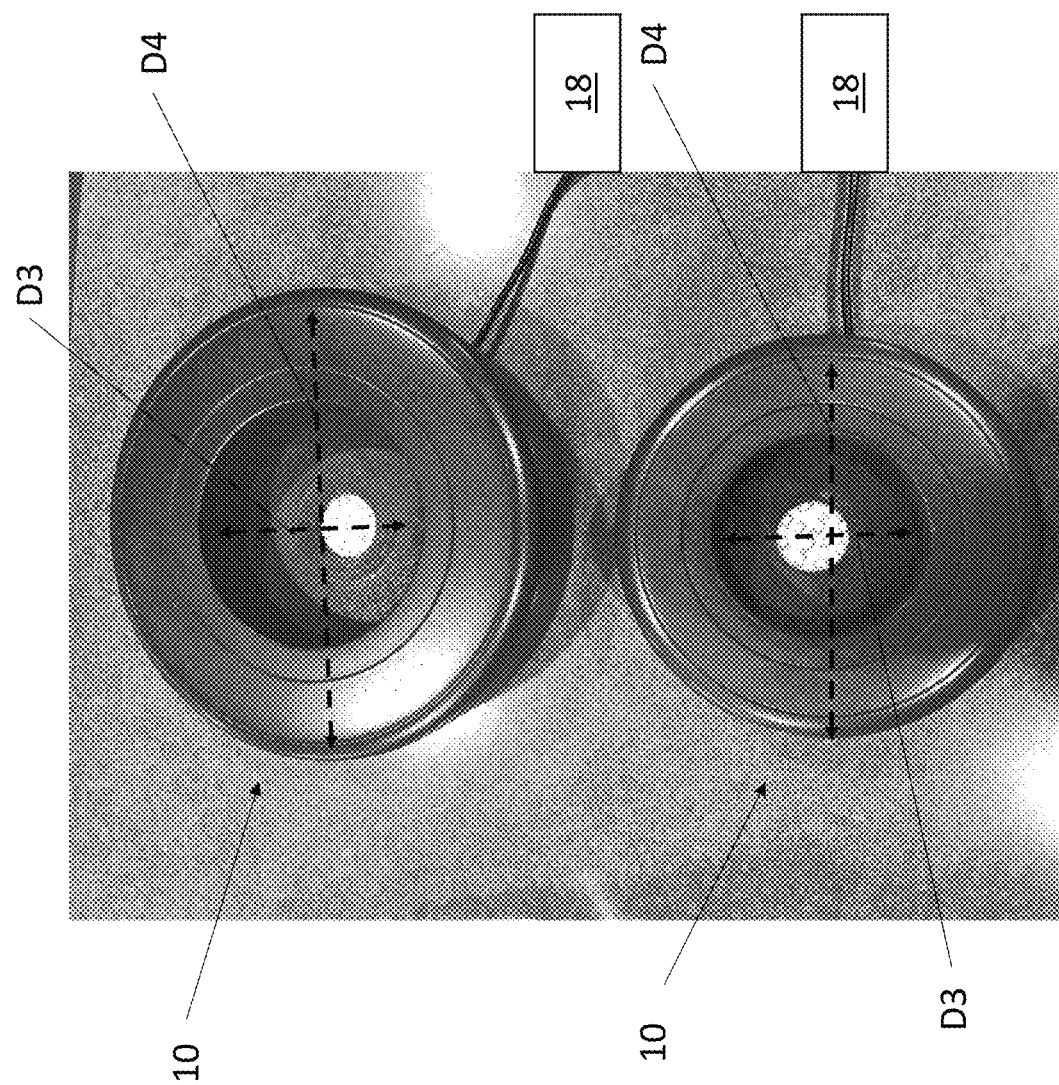
Figure 15:
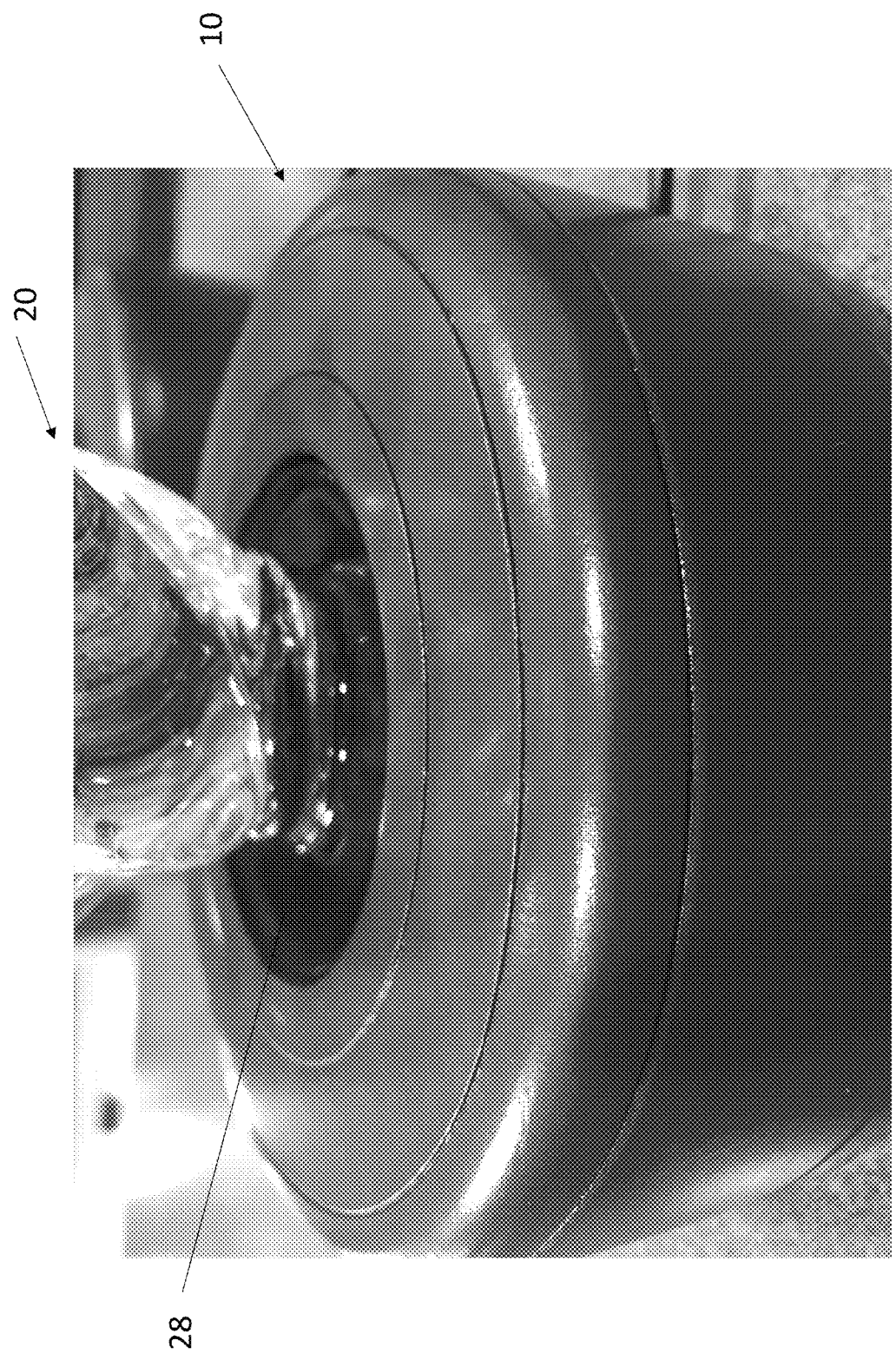
Figure 16:
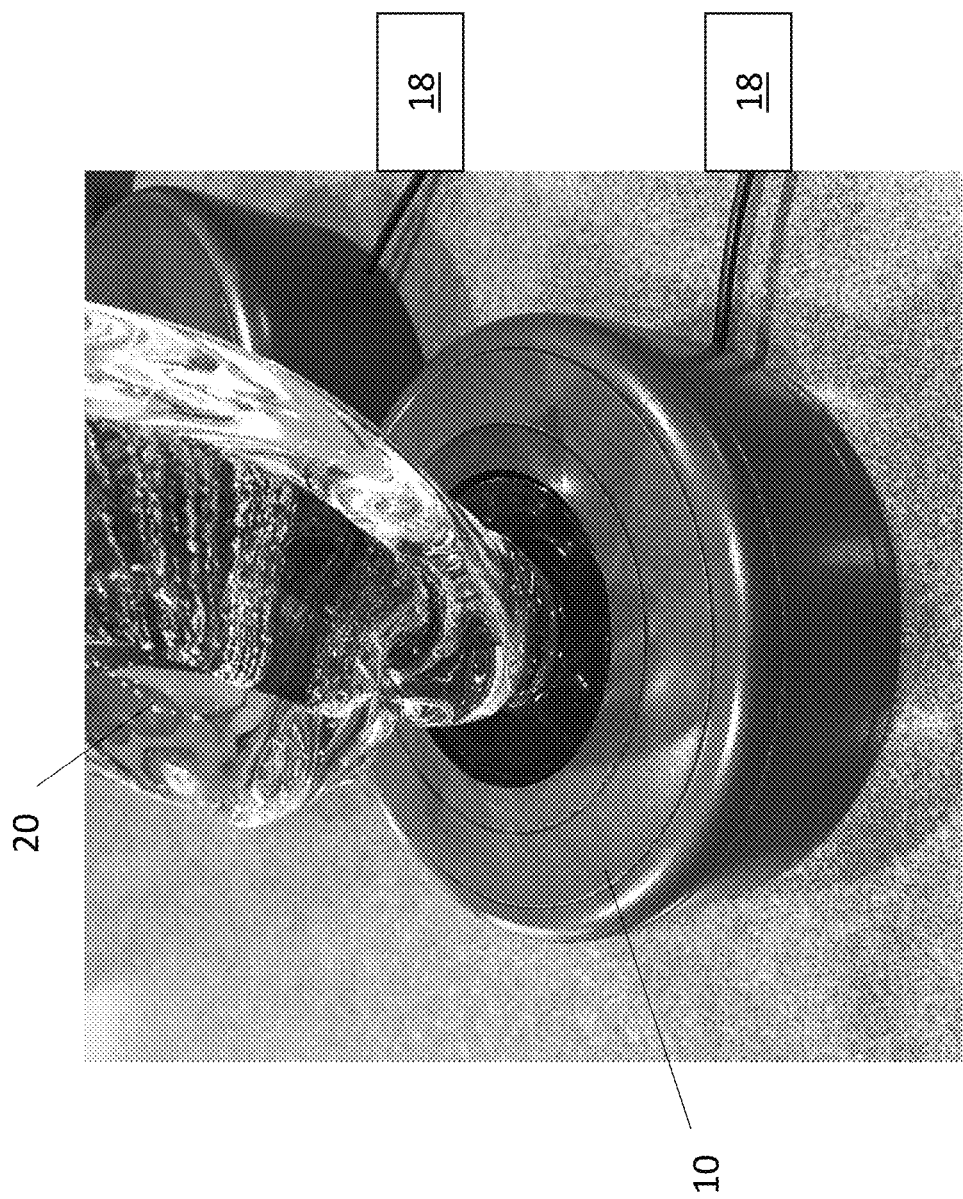
Figure 17:
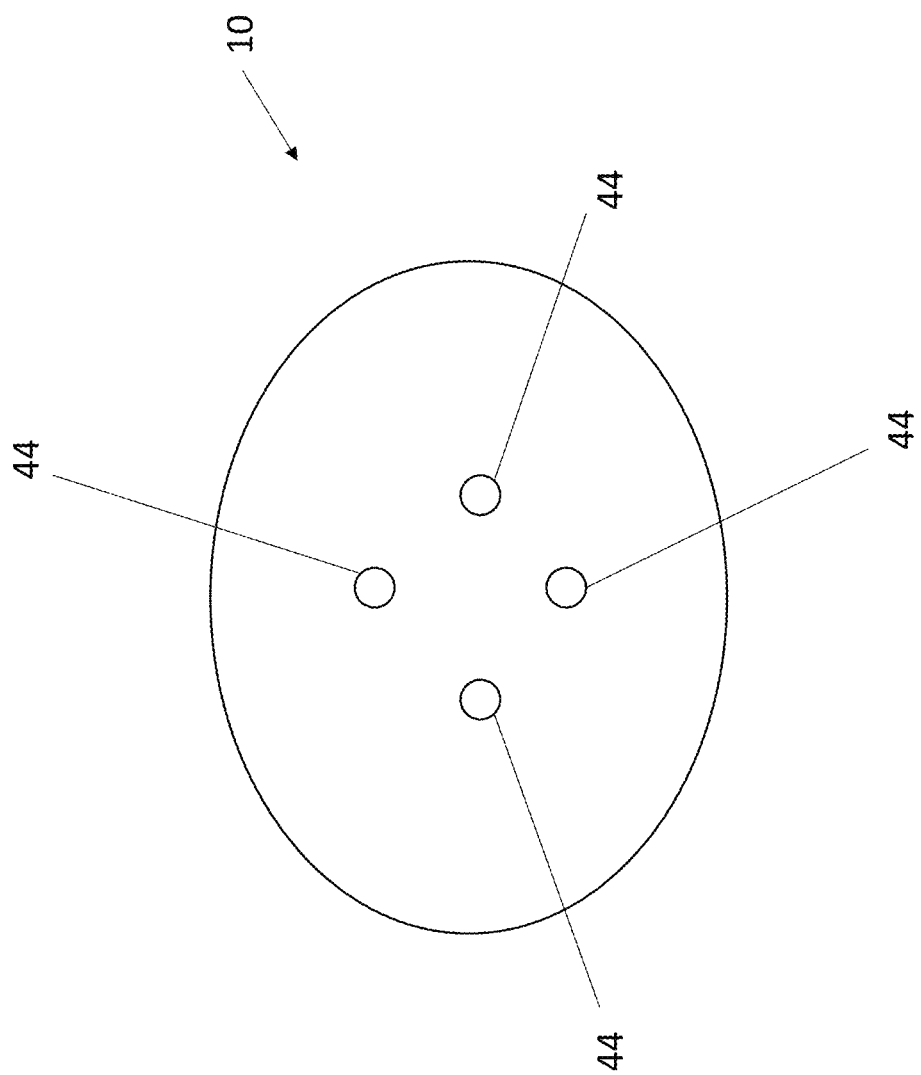

FIG. 12 illustrates a rig 30 for forming the outer stabilizing core 28. The rig 30 may comprise a base 32. A post 34 may extend from said base 32. A positioning block 36 may be attached to said post 34. The positioning block 36 may be configured to accommodate a tip portion 40 of the display portion 22. For example, without limitation, a hole may be drilled in the positioning block 32 to receive the conically shaped tip portion 40 of the art piece 20. One or more additional clamps or stabilizers 42 may be positioned along the post and be configured to secure the art piece 20. The base 32 may be configured to receive the art piece 20 with the inner core 23 formed. The base 32 may define a container area or mold configured to receive the preferably liquid resin forming the outer stabilizing core 28. One or more securing devices 38 may be located at the base 32 including, but not limited to, stabilizing arms, plates, fasteners, some combination thereof, or the like.

The art piece 20 may be placed within the rig 30 to hold the art piece 20 while the outer stabilizing core 28 is formed. Such formation may be accomplished by pouring a resin about the inner core 23 and curing the resin, such as but heat, cold, ultraviolet light, time, some combination thereof, or the like.

FIG. 13 through FIG. 17 illustrates exemplary bases 10 for the art piece 20. The bases 10 may be sized to accommodate the art pieces 20 having the outer stabilizing core 28. For example, without limitation, various size diameter D3 of the recess 14 may be sized to accommodate the diameter D6 of the outer stabilizing core 28. The diameter D4 of the housing 12 may be sized to provide stability. In exemplary embodiments, the diameter D3 of the recess 14 is sized to be no more than 1.8 mm larger than the diameter D6 of the outer stabilizing core 28. In exemplary embodiments, the recess 14 is no more than 1.8 mm larger than the outer stabilizing core 28. Alternatively, or additionally, the diameter D4 of the housing 12 may be sized to be at least one inch larger than the diameter D3 of the recess 14. The dimensions and tolerances shown or described herein are merely exemplary and are not intended to be limiting. Other dimensions and tolerances may be utilized.

The relatively larger recess 14 to accommodate the relatively larger outer stabilizing core 28, as compared to the stabilizing core 24 for example, may result in a larger lip 19 area.

One or more apertures 44 may be formed in the base 10. The apertures 44 may be configured to receive fasteners for securing the base 10 to a surface, such as but not limited to a shelf, furniture, counter, ground, or the like. In exemplary embodiments, without limitation, the apertures 44 may comprise pilot holes in the underside of the base 10. In other exemplary embodiments, without limitation, the apertures 44 may comprise through-holes provided in the lip 19. Any number and location of apertures 44 may be utilized.

In exemplary embodiments, without limitation, the substance 26 may be deposited in the lip 19 and/or over the illumination devices 16.

While certain shapes are described herein as being cylindrical or comprising cylindrically shaped portions defining diameters, such as but not limited to D1-D6, other shapes may be utilized with such diameters or other dimensions equating maximum width dimensions. For example, the inner core 23, outer stabilizing core 28, or stabilizing core 24 may be formed of any shape and a corresponding shaped recess 14 may be included at the base 10.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A system for displaying art in a manner which resists tipping from external forces while preserving artistic impression, said system comprising:
    an art piece comprising:
        a display portion;
        an inner core extending from a bottom of the display portion; and
        an outer stabilizing core provided about said inner core; and
    a base comprising:
        a housing;
        a recess extending from an upper surface of the housing and configured to removably receive the outer stabilizing core while said base is positioned upright on a surface such that said outer stabilizing core fits snugly within the recess and said display portion extends above the housing in an upright manner;
        a number of illumination devices located within the recess and configured to illuminate the art piece when said art piece is installed at said base and said number of illumination devices are powered;
        a power supply electrically connected to said number of illumination devices; and
        a lip formed in said housing at a bottom portion of said recess collectively about said illumination devices and defining a further depression of said recess, wherein said illumination devices are centrally located within said further depression of said recess, and configured to elevate said art piece above said illumination devices within said recess when said art piece is installed at said base.

2. The system of claim 1 wherein:
    at least said display portion and said inner core portion of said art piece comprises a unitary, solid, visually transmissive material.

3. The system of claim 2 wherein:
    said art piece is formed primarily from glass.

4. The system of claim 1 wherein:
    said base comprises wood;
    said power supply comprises a battery receptacle or a plug; and
    each of said illumination devices comprise at least one light emitting diode.

5. The system of claim 1 wherein:
    said inner core defines an inner core maximum width;
    said outer stabilizing core is cylindrically shaped and defines a maximum diameter which is larger than said inner core maximum width;
    said display portion comprises a display portion maximum width which is larger than said inner core maximum width but smaller than said maximum diameter.

6. The system of claim 1 wherein:
    said outer stabilizing core comprises an upper portion comprising a dyed material.

7. The system of claim 1 wherein:
    said outer stabilizing core is cylindrically shaped and defines a first diameter;
    said recess is cylindrically shaped and defines a second diameter; and
    a difference between said first diameter and said second diameter is no greater than 1.8 mm.

8. The system of claim 1 further comprising:
    a number of apertures located at said lip and configured to receive fasteners for securing said base to the surface.

9. The system of claim 1 further comprising:
    wax or silicon located on a lower surface of the stabilizing core.

10. A system for displaying art in a manner which resists tipping from external forces while preserving artistic impression, said system comprising:
    an art piece which is solid and formed primarily from glass and one or more colored materials, said art piece comprising:
        a display portion; and
        an inner core integrally formed with, and extending from, a bottom of the display portion; and
        an outer stabilizing core formed about said inner core and having a cylindrical shape which surrounds side and bottom surfaces of said inner core, wherein said outer stabilizing core comprises a resin and defines a first maximum diameter;
    a base formed primarily from wood and comprising:
        a housing having a cylindrical shape;
        a recess extending downward a distance from an upper surface of said housing, said recess having a cylindrical shape configured to removably receive said outer stabilizing core for upright orientation of said art piece while said base is positioned upright on a surface, wherein said recess is sized such that said display portion extends above the housing when said outer stabilizing core is received within said recess, and wherein said recess defines a second maximum diameter no more than 1.8 mm greater than the first maximum diameter such that said outer stabilizing core fits snugly within the recess;
        a number of light emitting diodes ("LEDs") placed in a centralized location at a further recess provided at a bottom portion of the recess and configured to shine upward, and transmit light through, the art piece when said art piece is installed at said base and said number of LEDs are illuminated;
        a lip formed by said housing and said recess, wherein said lip is located along the bottom portion of the recess and along an inner wall of the housing defined by said recess to collectively surround said LEDs, wherein said lip is configured to elevate said art piece above said LEDs and within said recess when said art piece is installed at said base;
        at least one hole located in the lip for fastening the base to a surface; and
        a plug electrically connected to said LEDs.

11. The system of claim 1 wherein:
    said inner core defines an inner core maximum cross-sectional area;

said outer stabilizing core defines an outer stabling core maximum cross-sectional area which is larger than said inner core cross-sectional area; and said display portion comprises a display portion maximum cross-sectional area which is larger than said outer stabling core maximum cross-sectional area.

* * * * *